J. H. MURPHY.
Dinner Can.
2 Sheets—Sheet 1.
No. 42,865.
Patented May 24, 1864.
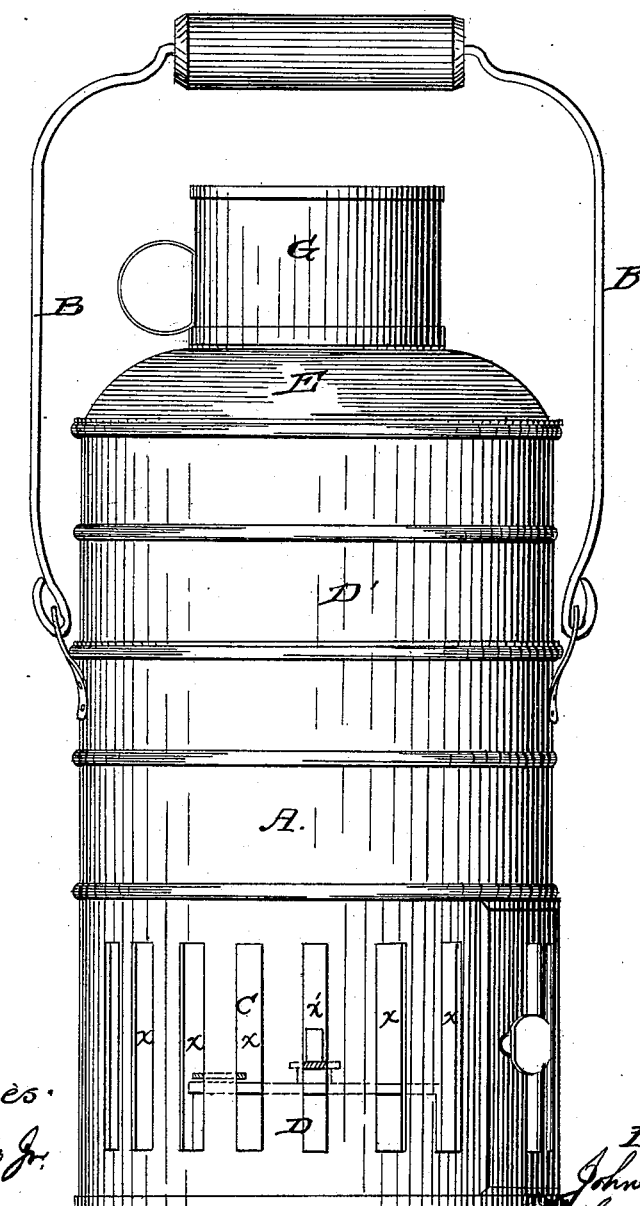

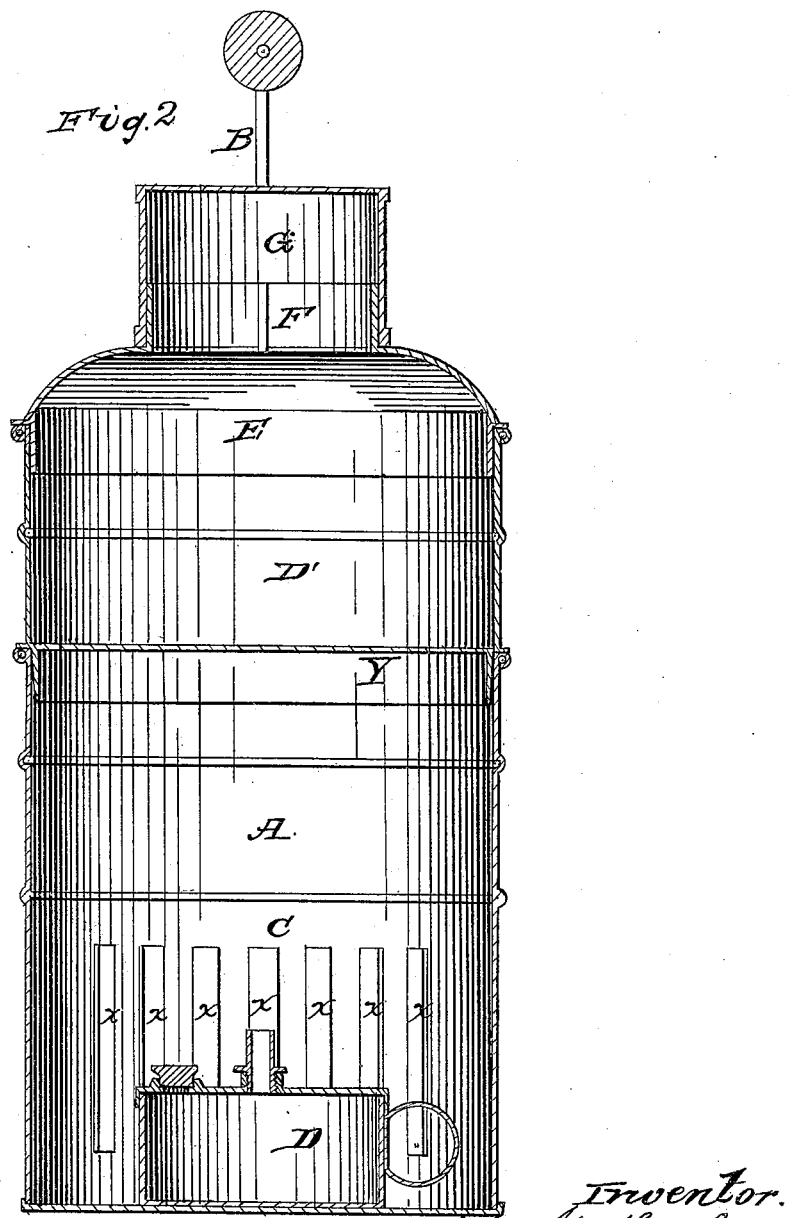

UNITED STATES PATENT OFFICE.

JOHN H. MURPHY, OF BOSTON, MASSACHUSETTS.

IMPROVEMENT IN DINNER-CANS.

Specification forming part of Letters Patent No. 42,865, dated May 24, 1864.

*To all whom it may concern:*

Be it known that I, JOHN H. MURPHY, a resident of Boston, in the county of Suffolk and State of Massachusetts, have invented an Improved Dinner-Can, or Apparatus for Transporting and Warming or Cooking Food; and I do hereby declare the same to be fully described in the following specification and represented in the accompanying drawings, of which—

Figure 1 is a front elevation, and Fig. 2 a vertical section of it.

My invention is intended for the use of mechanics or laboring men who are obliged to carry with them to the place of their labor their dinner or food. The article in question is not only intended for transportation of the food, both liquid and solid, but for warming or cooking it, as circumstances may require.

The first part of the apparatus is an open vessel or pail, A, not only provided with a swing-bail, B, by which it may be supported from the hand of a person, but having a heating or lamp space or chamber, C, arranged beneath it for the reception of a lamp, D. The sides of the chamber C are to be perforated with holes to enable air to pass to the lamp or its flame, as well as to allow of the escape of surplus gases or volatile products of combustion. The said holes (seen at $x \, x \, x$ in the drawings) in the sides of the lamp-chamber C, I make as vertical rectangular slits, extending from near the top to near the bottom of such chamber, the series of holes being carried around the chamber, so as not only to emit light in radial directions from the flame of the lamp, but to serve the purposes not only of allowing air to pass into the chamber to the flame, but of enabling the spent products of combustion, after being in contact with the bottom of the boiling-chamber, to pass down and escape out of such holes. There fits into the pail A a pan or vessel, D', open at top and provided with a cover, E, on which is erected a condiment-box or milk-holder, F, whose cover G is a drinking-cup, which, when inverted, covers the box F, as shown in the drawings.

The vessel A is intended to carry a decoction of coffee, tea, or chocolate, while the solid food—such as meat and bread—is to be placed within the vessel D', the condiments—such as pepper and salt—being held by the box F; or the said box F may be used as a receiver for milk, gravy, or other liquid.

By means of the lamp-chamber C and the lamp D coffee or a liquid while in the vessel A may be heated, and as it will surround or be beneath the vessel D' it will communicate heat to the latter, and thereby heat the meat or other matter which it may be desirable to heat or cook therein. The heat of the vessel D' or its contents will also, in turn, serve to warm any liquid or other matter which may be in the vessel F when it may be desirable to warm such. Thus it will be seen that the apparatus or workman's dinner-can may be used not only for transporting food and drink, but for heating or cooking it.

The ordinary dinner-can of mechanics and others has no heating apparatus, and therefore the user of it has generally to eat his food and drink his liquid when in a cold state; but with my improved article he has the means of warming or cooking the same. The lower part of the vessel D' is provided with an annular tapering flange, y, to fit and enter the upper part or mouth of the vessel A, as shown in Fig. 1. The cover E also fits the said mouth of the vessel A, and so that when the part D' is not in the vessel A the cover E may be placed there.

It will be seen that in my arrangement the vessel D' does not descend into the vessel A, but is placed above and on it, and so that it will answer as a cover to the vessel A, while articles may be cooked or a fluid heated within the latter, the steam of the heated liquid of the vessel A serving at the same time to heat anything which may be contained within the vessel D'. With my arrangement of parts I am also enabled to dispense with a chimney or flue to lead out of the lamp-chamber and up through the boiling-chamber and vessels thereof, which may be over the lamp-chamber.

I am aware of the lantern dinner pail, as described in the patent granted January 19, 1864, and numbered 41,274, and therefore I do not claim a lantern dinner-pail, constructed and operating substantially as and for the purpose described in the specification of the said patent, my invention being an improved dinner-can, and although in some respects it is like that covered by the said patent, yet in others it is very different, the differences imparting to it important advantages.

What, therefore, I do claim is—

The combination of the lamp-chamber constructed, as shown, with vertical passages in its walls or sides, with the vessels A and D' fitted thereto, substantially as above described.

J. H. MURPHY.

Witnesses:
R. H. EDDY,
F. P. HALE, Jr.,